Figure 3:
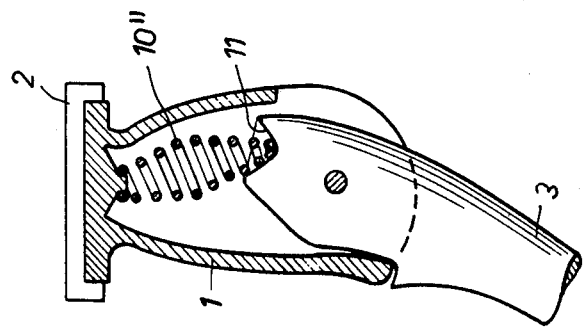

United States Patent

[11] 3,580,607

| [72] | Inventor | Theodor Pletscher |
| | | Zurich, Switzerland |
| [21] | Appl. No. | 743,405 |
| [22] | Filed | July 9, 1968 |
| [45] | Patented | May 25, 1971 |
| [73] | Assignee | Gebruder Pletscher |
| | | Marthalen, Zurich, Switzerland |
| [32] | Priority | July 10, 1967 |
| [33] | | Austria |
| [31] | | 6437/67 |

[54] BICYCLE SUPPORT
3 Claims, 3 Drawing Figs.

[52] U.S. Cl............................................. 280/301, 16/182
[51] Int. Cl............................................. B62h 1/02
[50] Field of Search................................ 280/301, 293, 298; 16/182; 287/136

[56] References Cited
UNITED STATES PATENTS

| 2,496,593 | 2/1950 | Morgan........................ | 280/301 |
| 2,587,790 | 3/1952 | Thalman....................... | 280/301 |
| 3,345,681 | 10/1967 | Pletscher...................... | 280/301 |

*Primary Examiner*—Benjamin Hersh
*Assistant Examiner*—Robert R. Song
*Attorney*—Waters, Roditi, Schwartz & Nissen ABSTRACT: A bicycle support comprises a socket to be secured to the horizontal rear fork members of a bicycle frame, a support arm having one end pivotally connected to said socket for tilting movement of the arm from a position of rest into operating position and held in one or the other of said positions by a tilting spring acting eccentrically on the arm with respect to its pivoting axis to urge the arm against an abutment on the socket, a spring counterbearing being associated with said pivotally connected end of the arm. The spring counterbearing is formed by an arched surface, for example by the surface of a ball lodged in a trough formed on the pivotally connected end of the support arm, or by a concave arched surface of the trough itself.

BICYCLE SUPPORT

This invention relates to bicycle supports of the kind having a socket adapted to be secured to the horizontal rear fork of a bicycle frame, and a support arm mounted in said socket for pivoting movement from a position of rest to an operative position, the support arm being positively held in both positions against an abutment of the socket by means of a tilting spring acting eccentrically on the supporting arm relatively to its pivoting axis.

In a known bicycle support of the kind referred to, the end of the tilting spring acts on the support arm by the intermediary of countersupport means connected with the support arm by a journal pin. The lowermost spring winding abuts against a shoulder of the countersupport means and surrounds a bolt penetrating into the lower end of the coil spring. The purpose of this bolt primarily is to prevent a buckling of the counterbearing with respect to the spring, to center the spring with respect to the journal pin and in addition to maintain the lower spring windings in their axially correct position. These precautions are particularly necessary because the lowermost spring winding is supported at a distance from the journal pin and because the spring being an article of mass production, the two supporting ends of the spring are not always absolutely plane-parallel. Moreover, the pivot pin of the supporting arm, the journal pin of the counterbearing means and the opposite counterbearing for the spring must match each other within narrow tolerances in order to obtain a safe operation and a long working life. It is obvious that expenditure, not only with regard to structure, but also with regard to assembly work, is relatively high for such known bicycle stands.

It is an object of the invention to provide a bicycle support which avoids these disadvantages which are due to the fact that the counterbearing is movably connected with the supporting arm.

According to the invention said tilting spring has one end thereof supported against an arched surface of a spring counterbearing coacting with said support arm.

Figure 2:
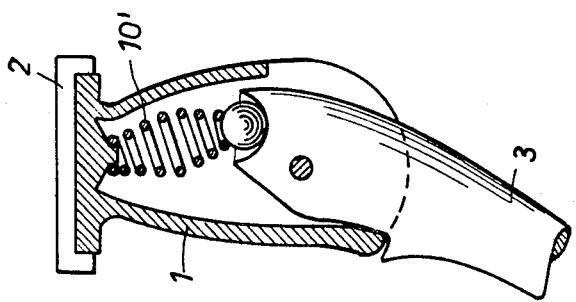
Figure 1:
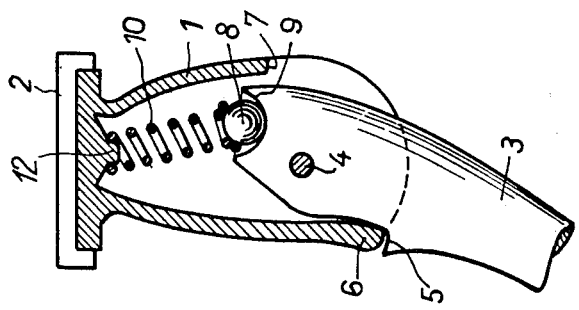

Embodiments of the invention are illustrated by way of example in the accompanying drawings, in which, FIG. 1 to 3 each illustrate one embodiment of a bicycle support in partial section.

In all FIGS. like parts are designated with the same reference numerals, common features being described only once in order to avoid repetition.

According to FIG. 1 a socket 1 to the bicycle support is secured in a manner not shown in detail, for example by a screw, to an anchor plate 2 which in turn is secured, e.g. welded, to the horizontal frame members of the rear fork. The upper end of the support arm 3 engages into the lower end of the downwardly open socket 1, where it is pivotally mounted by means of a journal pin 4. In the represented operative position of the arm, a shoulder 5 of the latter engages over an abutment 6 of the socket. The pivoting movement of the arm 3 from the represented operative position into the position of rest is effected in counterclockwise direction, this movement being limited by a further abutment 7 of the socket.

In the embodiment according to FIG. 1, the spring counterbearing is formed as a ball 8 which is loosely supported in a trough 9 formed in the upper end of the support arm 3. The lowermost winding of the coil spring 10 is supported on the ball 8, while the other end of the spring abuts against the upper spring counterbearing 12 integral with the socket 1.

Balls 8, as used as a spring counterbearing, are available from the ball bearing industry in appropriate type and at an extremely cheap price. The ball can be rigidly connected to the lowermost spring winding, for example by an adhesive, in order to simplify the assembly. A connection of the two members could also be obtained by looping the last spring winding about the ball. The concave surface of the trough 9 can be provided, for example, with a plastic coating or with a suitable permanent lubricant.

In this described example, the supporting point of the spring on the spring counterbearing is situated in close proximity of the hinge axis of the counterbearing, and the spring is sufficiently axially aligned for correct operation. The position of the pivoting axis 4 is no longer critical; a jamming of the movable parts in this or other respects is practically excluded. The upper spring counterbearing 12 can be of spherical shape and formed as a protuberance or a recess, or roof-shaped (as represented). A tuning or matching of the two spring counterbearings one with respect to the other is not required.

In the example according to FIG. 2, the cylindrical spring 10 of FIG. 1 has been replaced by a barrel-shaped spring 10'. A spring of this type offers the advantage of an increased resistance to buckling.

The embodiment according to FIG. 3 distinguishes over that of FIG. 1, on the one hand, by a barrel-shaped spring 10'' instead of the cylindrical spring 10, and on the other hand, by a particular formation of the lower spring counterbearing. This latter consists of an outwardly flaring blind hole 11 at the upper end of the support arm 3, the lower end of the spring approaching point-shape being directly supported on the arched surface of the hole. The blind hole 11 is so dimensioned that the spring 10'' (or for example also a cylindrical spring) has the required clearance for operation.

I claim:

1. A bicycle support having a socket adapted to be secured to the rear horizontal fork of a bicycle frame, and a support arm having one end pivotally mounted in said socket for movement of the arm from a position of rest to an operative position, the support arm being positively held in both positions against an abutment of the socket by means of a tilting spring acting eccentrically on the supporting arm with respect to its pivoting axis, wherein the improvement comprises spring counterbearing means constituted by an arched surface associated with said pivotally mounted end of the support arm and directly supporting one end of the tilting spring, said spring counterbearing means comprising a ball which is located in a trough of the support arm and engages the last coil of said spring end, said trough having a radius of curvature greater than the radius of the ball.

2. A bicycle support according to claim 1, in which said ball is rigidly connected with the spring end.

3. A bicycle positively having a socket adapted to be secured to the rear horizontal fork of a bicycle frame, and a support arm having one end pivotally mounted in said socket for movement of the arm from a position of rest to an operative position, the support arm being positively held in both positions against an abutment of the socket by means of a tilting spring having one end supported by first counterbearing means on said socket and the other end supported by second counterbearing means on said support arm and acting eccentrically on the support arm with respect to its pivoting axis, an improvement wherein said second counterbearing means comprises an inwardly curved surface on said pivotally mounted end of the support arm supporting said other end of the spring both for tilting and lateral movement with respect to said curved surface of the pivotally mounted end of the support arm, and a ball secured to said other end of the spring, said ball having a smaller radius than the radius of curvature of said curved surface.